United States Patent
Jiang

(10) Patent No.: US 11,057,142 B1
(45) Date of Patent: Jul. 6, 2021

(54) METHOD AND SYSTEM TO ESTIMATE SRS INDUCED GAIN CHANGE IN OPTICAL COMMUNICATION NETWORKS

(71) Applicant: HUAWEI TECHNOLOGIES CO., LTD., Guangdong (CN)

(72) Inventor: Zhiping Jiang, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/921,034

(22) Filed: Jul. 6, 2020

(51) Int. Cl.
*H04B 10/079* (2013.01)
*H04J 14/02* (2006.01)

(52) U.S. Cl.
CPC .... *H04J 14/0221* (2013.01); *H04B 10/07955* (2013.01)

(58) Field of Classification Search
None
See application file for complete search history.

(56) References Cited

U.S. PATENT DOCUMENTS

| | | | | |
|---|---|---|---|---|
| 6,292,289 B1* | 9/2001 | Sugaya | ............... | H04B 10/0775 359/337 |
| 6,310,716 B1* | 10/2001 | Evans | ...................... | H01S 3/302 359/334 |
| 6,510,000 B1* | 1/2003 | Onaka | ...................... | H01S 3/302 359/334 |
| 6,882,466 B1* | 4/2005 | Shimojoh | ........... | H01S 3/06758 359/334 |
| 6,891,661 B2* | 5/2005 | Hayashi | ............. | H04B 10/2916 359/334 |
| 2002/0024723 A1* | 2/2002 | Sekiya | .................... | H01S 3/302 359/337.1 |

(Continued)

FOREIGN PATENT DOCUMENTS

WO    2019169642 A1    9/2019

OTHER PUBLICATIONS

English abstract of WO2019169642A1 retrieved from https://worldwide.espacenet.com/ on May 26, 2020.

*Primary Examiner* — Jai M Lee
(74) *Attorney, Agent, or Firm* — BCF LLP

(57) ABSTRACT

The disclosed systems, structures, and methods are directed to an optical communication comprising a first wavelength division multiplexer (WDM) configured to receive WDM signals, the first WDM is further configured to split the received WDM signals into C band WDM signals and L band WDM signals, a C band amplifier configured and an L band amplifier configured to amplify the C band WDM signals and L band WDM signals respectively and compute a fast total instantaneous powers $P_{tot\text{-}CBand}(t)$ and $P_{tot\text{-}LBand}(t)$ on a fast time scale, a slow per channel power detector configured to extract slow per channel powers $P(\lambda_1)$, $P(\lambda_2) \ldots P(\lambda_n)$ on a slow time scale, a Stimulated Raman Scattering (SRS) estimator configured to estimate an SRS induced gain change in the WDM signals, and a second WDM configured to combine and transmit the amplified C band WDM signals and L band WDM signals over optical cables.

20 Claims, 12 Drawing Sheets

(56) References Cited

U.S. PATENT DOCUMENTS

| | | | | |
|---|---|---|---|---|
| 2002/0063923 | A1* | 5/2002 | Coppeta | G02B 6/4215 398/34 |
| 2002/0114062 | A1* | 8/2002 | Simard | H04B 10/2537 359/337 |
| 2002/0141008 | A1* | 10/2002 | Chbat | H04B 10/2941 398/26 |
| 2002/0154359 | A1* | 10/2002 | Tsuda | H04J 14/0213 359/337.13 |
| 2003/0099030 | A1* | 5/2003 | Kumasako | H04B 10/2916 359/334 |
| 2006/0203329 | A1* | 9/2006 | Nishihara | H04B 10/2942 359/337 |
| 2009/0016727 | A1* | 1/2009 | Ueki | H04J 14/0204 398/79 |
| 2015/0189407 | A1* | 7/2015 | Jiang | H04J 14/0224 398/34 |
| 2017/0005727 | A1* | 1/2017 | Kachita | H04B 10/07955 |
| 2019/0312641 | A1* | 10/2019 | Ishii | H04B 10/2942 |

* cited by examiner

METHOD AND SYSTEM TO ESTIMATE SRS INDUCED GAIN CHANGE IN OPTICAL COMMUNICATION NETWORKS

CROSS-REFERENCE TO RELATED APPLICATIONS

This is the first application filed for the instantly disclosed technology.

TECHNICAL FIELD

The present disclosure generally relates to the field of optical communication networks and, in particular, to methods and systems to estimate Stimulated Raman Scattering (SRS) induced gain change in optical communication networks.

BACKGROUND

In wavelength division multiplexing (WDM)-based optical communication networks, multiple optical channels are carried on a single optical fiber. The single optical fiber is included in an optical fiber link. The optical fiber link connecting two nodes further includes optical amplifiers and any other optical components along an optical transmission line. Optical amplifiers are used to amplify WDM signals which are transmitted in the optical fiber link. These amplifiers are used both in-line and at the transmitting and receiving end of the optical fiber link.

Each optical channel in the WDM-based optical communication network operates at a particular wavelength in the optical fiber. New channels may be added and existing channels may be dropped in a node using a reconfigurable optical add/drop multiplexer (OADM).

A common nonlinear phenomenon in the WDM-based optical communication networks is Stimulated Raman Scattering (SRS). SRS is a nonlinear effect which occurs as a result of an incident wave scattering in a medium so that the incident wave is partially transferred to a higher wavelength. In the optical fiber supporting multiple wavelength-specific channels, energy from the channel with the shorter wavelength scatter to a longer wavelength channels. Depending on the channel/fiber conditions in the optical fiber, such as channel numbers, channel locations, channel power, optical fiber type, fiber length, the result of this scattering phenomenon is inter-channel signal mixing and a progressive increase or decrease in perceived gain at higher wavelength channels, which contributes to a spectrum tilt in the transmitted WDM signal. The spectrum tilt is further amplified as the WDM signal is transmitted through additional amplifiers and fiber in the network. To this end, SRS must be properly compensated to achieve optimal performance.

Traditionally, only C band was used for transmission of WDM signals. However, to cater to the growing bandwidth requirement and increasing the total capacity, transmission in C+L band has been commercialized. SRS effect in C+L bands is much stronger than in the C only band. SRS mitigation also must consider the interaction between C and L bands.

Another common problem faced by the WDM-based optical communication networks is equipment failure, such as optical amplifier failure. Such failures may result in a transient effect on the transmission of surviving channels. Due to transient effect, the surviving channels may also experience transmission errors. Moreover, an equipment failure results in a change in a spectral power distribution as well as in optical power at the input of the optical amplifiers. A large change in the spectral power distribution results in a large change of SRS induced spectrum tilt in the transmission of WDM signals in the optical fiber. This is especially prominent for dense WDM signal transmissions.

To this end, there is an interest in estimating SRS effect during normal transmission and also during transient due equipment failure. Further to the estimated SRS effect, there is also an interest in facilitating remedial measures to overcome SRS effects.

SUMMARY

An object of the present disclosure is to provide an optical communication system comprising a first wavelength division multiplexer (WDM) configured to receive WDM signals in C+L bands, the first WDM is further configured to split the received WDM signals into C band WDM signals and L band WDM signals, a C band amplifier configured to amplify the C band WDM signals and compute a fast total instantaneous power $P_{tot-CBand}(t)$ associated with the C band WDM signals on a fast time scale, an L band amplifier configured to amplify the L band WDM signals and compute a fast total instantaneous power $P_{tot-LBand}(t)$ associated with the L band WDM signals on a fast time scale, a slow per channel power detector configured to extract slow per channel powers $P(\lambda_1)$, $P(\lambda_2)$ ... $P(\lambda_n)$ associated with the WDM signals on a slow time scale, a Stimulated Raman Scattering (SRS) estimator configured to estimate an SRS induced gain change in the WDM signals using the fast total instantaneous power $P_{tot-CBand}(t)$ the fast total instantaneous power $P_{tot-LBand}(t)$ and the slow per channel powers $P(\lambda_1)$, $P(\lambda_2)$ ... $P(\lambda_n)$ corresponding to n wavelengths in the WDM signals, and a second WDM configured to combine and transmit the amplified C band WDM signals and L band WDM signals over optical cables.

In accordance with other aspects of the present disclosure, the optical communication system, wherein the fast time scale is of the order of microseconds.

In accordance with other aspects of the present disclosure, the optical communication system, wherein the slow time scale is in the range of milliseconds to seconds.

In accordance with other aspects of the present disclosure, the optical communication system, wherein the SRS estimator computes an instantaneous fast per channel power in C band as follows:

$$P(\lambda_i, t) = \frac{P(\lambda_i)}{\sum_{i=1}^{k} P(\lambda_i)} P_{tot-CBand}(t)$$

where, $P(\lambda_i, t)$ is the instantaneous fast per channel power corresponding to ith wavelength in C band at time instant t, $P(\lambda_i)$ is slow per channel power corresponding to ith wavelength in C band, $$\sum_{i=1}^{k} P(\lambda_i)$$

is sum of k slow per channel powers in C band, and $P_{tot-CBand}(t)$ is the fast total instantaneous power associated with the C band WDM signals at time instant t.

In accordance with other aspects of the present disclosure, the optical communication system, wherein the SRS estimator computes an instantaneous fast per channel power in L band as follows:

$$P(\lambda_i, t) = \frac{P(\lambda_i)}{\sum_{i=k+1}^{n} P(\lambda_i)} P_{tot-LBand}(t)$$

where, $P(\lambda_i, t)$ is the instantaneous fast per channel power corresponding to ith wavelength in L band at time instant t, $P(\lambda_i)$ is slow per channel power corresponding to ith wavelength in L band, $$\sum_{i=k+1}^{n} P(\lambda_i)$$

is sum of n-k slower per channel powers in L band, and $P_{tot-LBand}(t)$ is the fast total instantaneous power associated with the L band WDM signals at time instant t.

In accordance with other aspects of the present disclosure, the optical communication system, wherein the SRS estimator estimate SRS induced gain change as follows:

$$G(dB)(\lambda_1, \lambda_2 \ldots \lambda_n) = 4.3429 \left( G_R \frac{L_{eff}}{A_{eff}} - \alpha_S L \right)$$

where, $G_R$ is a Raman gain vector, $\alpha_S$ is an optical fiber loss coefficient for signal, $A_{eff}$ is the effective area of the optical fiber, $L_{eff}$ is the effective nonlinear length of the optical fiber, L is the actual length of optical fiber.

In accordance with other aspects of the present disclosure, the optical communication system, wherein the SRS estimator generates at least one control signal to adjust a gain of the C band amplifier and/or L band amplifier in accordance with the estimated SRS induced gain.

In accordance with other aspects of the present disclosure, the optical communication system, wherein the C band amplifier and/or L band amplifier are further configured to adjust their gain in accordance with the at least one control signal.

In accordance with other aspects of the present disclosure, the optical communication system, wherein the slow per channel power detector includes an optical performance monitor.

In accordance with other aspects of the present disclosure, the optical communication system, wherein the slow per channel power detector includes a pilot tone detector.

Another object of the present disclosure is to provide an optical communication method comprising receiving, by a first wavelength division multiplexer (WDM), WDM signals in C+L bands, splitting, by the first WDM, the received WDM signals into C band WDM signals and L band WDM signals, amplifying, by a C band amplifier, the C band WDM signals, computing, by the C band amplifier, a fast total instantaneous power $P_{tot-CBand}(t)$ associated with the C band WDM signals on a fast time scale, amplifying, by an L band amplifier, the L band WDM signals, computing, by the L band amplifier, a fast total instantaneous power $P_{tot-LBand}(t)$ associated with the L band WDM signals on a fast time scale, extracting, by a slow per channel power detector, slow per channel powers $P(\lambda_1), P(\lambda_2) \ldots P(\lambda_n)$ associated with the WDM signals on a slow time scale, estimating, by a Stimulated Raman Scattering (SRS) estimator, an SRS induced gain change in the WDM signals using the fast total instantaneous Power $P_{tot-CBand}(t)$, the fast total instantaneous power $P_{tot-LBand}(t)$, and the slow per channel powers $P(\lambda_1), P(\lambda_2) \ldots P(\lambda_n)$ corresponding to n wavelengths in the WDM signals, and combining and transmitting, by a second WDM, the amplified C band WDM signals and L band WDM signals bands over optical cables.

In accordance with other aspects of the present disclosure, the optical communication method, wherein the fast time scale is of the order of microseconds.

In accordance with other aspects of the present disclosure, the optical communication method wherein the slow time scale is in the range of milliseconds to seconds.

In accordance with other aspects of the present disclosure, the optical communication method further comprises computing, by the SRS estimator, an instantaneous fast per channel power in C band as follows:

$$P(\lambda_i, t) = \frac{P(\lambda_i)}{\sum_{i=1}^{k} P(\lambda_i)} P_{tot-CBand}(t)$$

where, $P(\lambda_i, t)$ is the instantaneous fast per channel power corresponding to ith wavelength in C band at time instant t, $P(\lambda_i)$ is slow per channel power corresponding to ith wavelength in C band, $$\sum_{i=1}^{k} P(\lambda_i)$$

is sum or K slow per channel powers in C band, and $P_{tot-CBand}(t)$ is the fast total instantaneous power associated with the C band WDM signals at time instant t.

In accordance with other aspects of the present disclosure, the optical communication method further comprises computing, by the SRS estimator, an instantaneous fast per channel power in L band as follows:

$$P(\lambda_i, t) = \frac{P(\lambda_i)}{\sum_{i=k+1}^{n} P(\lambda_i)} P_{tot-LBand}(t)$$

where, $P(\lambda_i, t)$ is the instantaneous fast per channel power corresponding to ith wavelength in L band at time instant t, $P(\lambda_i)$ is slow per channel power corresponding to ith wavelength in L band, $$\sum_{i=k+1}^{n} P(\lambda_i)$$

is sum of n-k slow per channel powers in L band, and $P_{tot-LBand}(t)$ is the fast total instantaneous power associated with the L band WDM signals at time instant t.

In accordance with other aspects of the present disclosure, the optical communication method wherein the SRS estimator estimate SRS induced gain change as follows:

$$G(dB)(\lambda_1, \lambda_2 \ldots \lambda_n) = 4.3429\left(G_R \frac{L_{eff}}{A_{eff}} - \alpha_S L\right)$$

where, $G_R$ is a Raman gain vector, $\alpha_S$ is an optical fiber loss coefficient for signal, $A_{eff}$ is the effective area of the optical fiber, $L_{eff}$ is the effective nonlinear length of the optical fiber, L is the actual length of optical fiber.

In accordance with other aspects of the present disclosure, the optical communication method further comprises generating, by the SRS estimator, at least one control signal to adjust a gain of the C band amplifier and/or L band amplifier in accordance with the estimated SRS induced gain.

In accordance with other aspects of the present disclosure, the optical communication method wherein the C band amplifier and/or L band amplifier adjust their gain in accordance with the at least one control signal.

In accordance with other aspects of the present disclosure, the optical communication method wherein the slow per channel power detector includes an optical performance monitor.

In accordance with other aspects of the present disclosure, the optical communication method wherein the slow per channel power detector includes a pilot tone detector.

BRIEF DESCRIPTION OF THE FIGURES

The features and advantages of the present disclosure will become apparent from the following detailed description, taken in combination with the appended drawings, in which.

Figure 1:
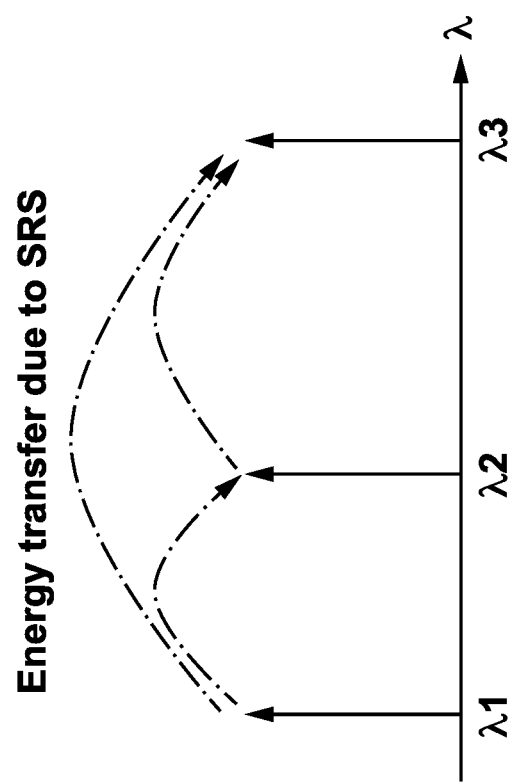
FIG. 1 (Prior Art) illustrates an example of energy transfer in three wavelengths $\lambda_1$, $\lambda_2$, $\lambda_3$.

It is to be understood that throughout the appended drawings and corresponding descriptions, like features are identified by like reference characters. Furthermore, it is also to be understood that the drawings and ensuing descriptions are intended for illustrative purposes only and that such disclosures are not intended to limit the scope of the claims.

DETAILED DESCRIPTION

Various representative embodiments of the described technology will be described more fully hereinafter with reference to the accompanying drawings, in which representative embodiments are shown. The present technology concept may, however, be embodied in many different forms and should not be construed as limited to the representative embodiments set forth herein. Rather, these representative embodiments are provided so that the disclosure will be thorough and complete, and will fully convey the scope of the present technology to those skilled in the art. In the drawings, the sizes and relative sizes of layers and regions may be exaggerated for clarity. Like numerals refer to like elements throughout.

It will be understood that, although the terms first, second, third, etc. may be used herein to describe various elements, these elements should not be limited by these terms. These terms are used to distinguish one element from another. Thus, a first element discussed below could be termed a second element without departing from the teachings of the present technology. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is only intended to describe particular representative embodiments and is not intended to be limiting of the present technology. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a digital signal processor (DSP). Moreover, explicit use of the term a "processor" should not be construed to refer exclusively to hardware capable of executing software, and may implicitly include, without limitation, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules or units which are implied to be software, may be represented herein as any combination of flowchart elements or other elements indicating performance of process steps and/or textual description. Such modules may be executed by hardware that is expressly or implicitly shown. Moreover, it should be understood that module may include for example, but without being limitative, computer program logic, computer program instructions, software, stack, firmware, hardware circuitry or a combination thereof which provides the required capabilities.

With these fundamentals in place, we will now consider some non-limiting examples to illustrate various implementations of aspects of the present disclosure.

As briefly discussed above, Stimulated Raman Scattering (SRS), causes energy transfer from shorter wavelengths to longer wavelengths. This process happens between any two wavelengths. FIG. 1 (Prior Art) illustrates an example of energy transfer in three wavelengths $\lambda_1$, $\lambda_2$, $\lambda_3$. As shown, $\lambda_1 < \lambda_2 < \lambda_3$ and the energy from $\lambda_1$ is transferred to $\lambda_2$ and $\lambda_3$ and the energy from $\lambda_2$ is transferred to $\lambda_3$. SRS induced energy transfer may depend on the channel power, channel separation, fiber type, fiber length. The SRS induced gain for each channel can be mathematically estimated. The following shows a simplified calculation method. More accurate model can also be readily derived.

Figure 2:
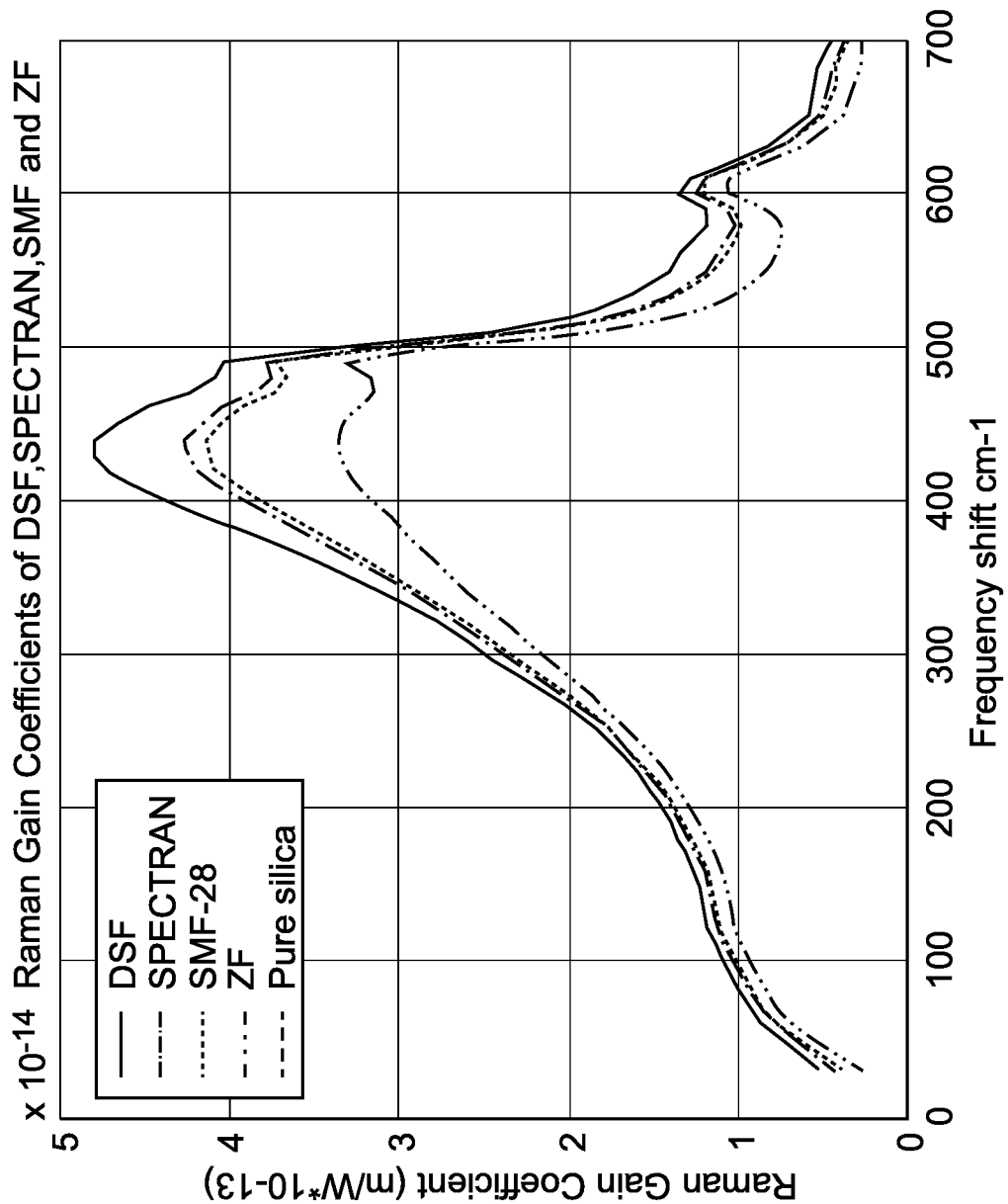
FIG. 2 (Prior Art) illustrates a typical Raman gain coefficient versus frequency shifts with different optical fibers.

In order to determine a gain or loss in WDM signal due to the SRS effect, typically a starting point is to compute a signal power $P_S(L)$ at a distance L. The signal power $P_S(L)$ is related to power $P_S(0)$ at a distance 0 and is given as:

$$P_S(L) = P_S(0)\exp\left(g_R \frac{P_0}{A_{\textit{eff}}} L_{\textit{eff}} - \alpha_S L\right) \quad (1)$$

where, $\alpha_S$ is the optical fiber loss coefficient for signal, $P_0$ is the pump power at the optical fiber input, $A_{\textit{eff}}$ is the effective area, $g_R$ is the Raman gain coefficient, and $L_{\textit{eff}}$ is the effective nonlinear length and is given as:

$$L_{\textit{eff}} = \frac{1 - \exp(\alpha_P L)}{\alpha_P} \quad (2)$$

where, $\alpha_P$ is the attenuation at the pump wavelength. FIG. 2 (Prior Art) illustrates a typical Raman gain coefficient versus frequency shifts with different optical fibers.

The overall gain (including Raman gain and fiber attenuation) in dB is given as:

$$G\_dB = 10\log_{10}\exp\left(g_R \frac{P_0}{A_{\textit{eff}}} L_{\textit{eff}} - \alpha_S L\right) = \quad (3)$$

$$\frac{10}{\ln 10}\left(g_R \frac{P_0}{A_{\textit{eff}}} L_{\textit{eff}} - \alpha_S L\right) = 4.3429\left(g_R \frac{P_0}{A_{\textit{eff}}} L_{\textit{eff}} - \alpha_S L\right)$$

It is to be noted that equation (3) is for one signal and one pump. However, equation (3) may be generalized for n wavelength signals with power $[P(\lambda_1), (\lambda_2) \ldots P(\lambda_n)]$, each one can act as pump light for other n-1 wavelength signals. To generalize equation (3) to n wavelength signals a frequency shift matrix $F_{\textit{shift}}$ may be represented as:

$$F_{\textit{shift}} = \begin{bmatrix} 0 & \frac{1}{\lambda_1} - \frac{1}{\lambda_2} & \frac{1}{\lambda_1} - \frac{1}{\lambda_3} & \cdots & \frac{1}{\lambda_1} - \frac{1}{\lambda_n} \\ \frac{1}{\lambda_2} - \frac{1}{\lambda_1} & 0 & \frac{1}{\lambda_2} - \frac{1}{\lambda_3} & \cdots & \frac{1}{\lambda_2} - \frac{1}{\lambda_n} \\ \frac{1}{\lambda_3} - \frac{1}{\lambda_1} & \frac{1}{\lambda_3} - \frac{1}{\lambda_2} & 0 & \cdots & \frac{1}{\lambda_3} - \frac{1}{\lambda_n} \\ \vdots & \vdots & \vdots & \cdots & \vdots \\ \frac{1}{\lambda_n} - \frac{1}{\lambda_1} & \frac{1}{\lambda_n} - \frac{1}{\lambda_2} & \frac{1}{\lambda_n} - \frac{1}{\lambda_3} & & 0 \end{bmatrix} \quad (4)$$

The Raman gain vector $G_R$ is given by:

$$G_R(\lambda_1, \lambda_2 \ldots \lambda_n) = [P(\lambda_1), P(\lambda_2) \ldots P(\lambda_n)]g_R(F_{\textit{shift}}) \quad (5)$$

In the above treatment, the shift matrix reflects the fact that the Raman gain coefficient is roughly proportional to the frequency separation between two channels. To this end, equation (3) is re-written as:

$$G(dB)(\lambda_1, \lambda_2 \ldots \lambda_n) = 4.3429\left(G_R \frac{L_{\textit{eff}}}{A_{\textit{eff}}} - \alpha_S L\right) \quad (6)$$

Therefore, given the optical fiber parameters and channel conditions, the SRS induced gain can be calculated by equation (6) for every channel. It is to be noted that in dense WDM (DWDM)-based optical communication networks the channel launch power into the optical fibers is more or less fixed/determined, one of the factors affecting the SRS induced gain is the channel loading (i.e. channel numbers and locations).

As noted above, traditionally only C band was used for transmission of WDM signals. However, to cater to the growing bandwidth requirement and increasing the total capacity, transmission in C+L band has been commercialized. It is contemplated that due to limited amplification bandwidth of the optical amplifiers, C band and L band WDM signals amplifications are performed separately.

Figure 3:
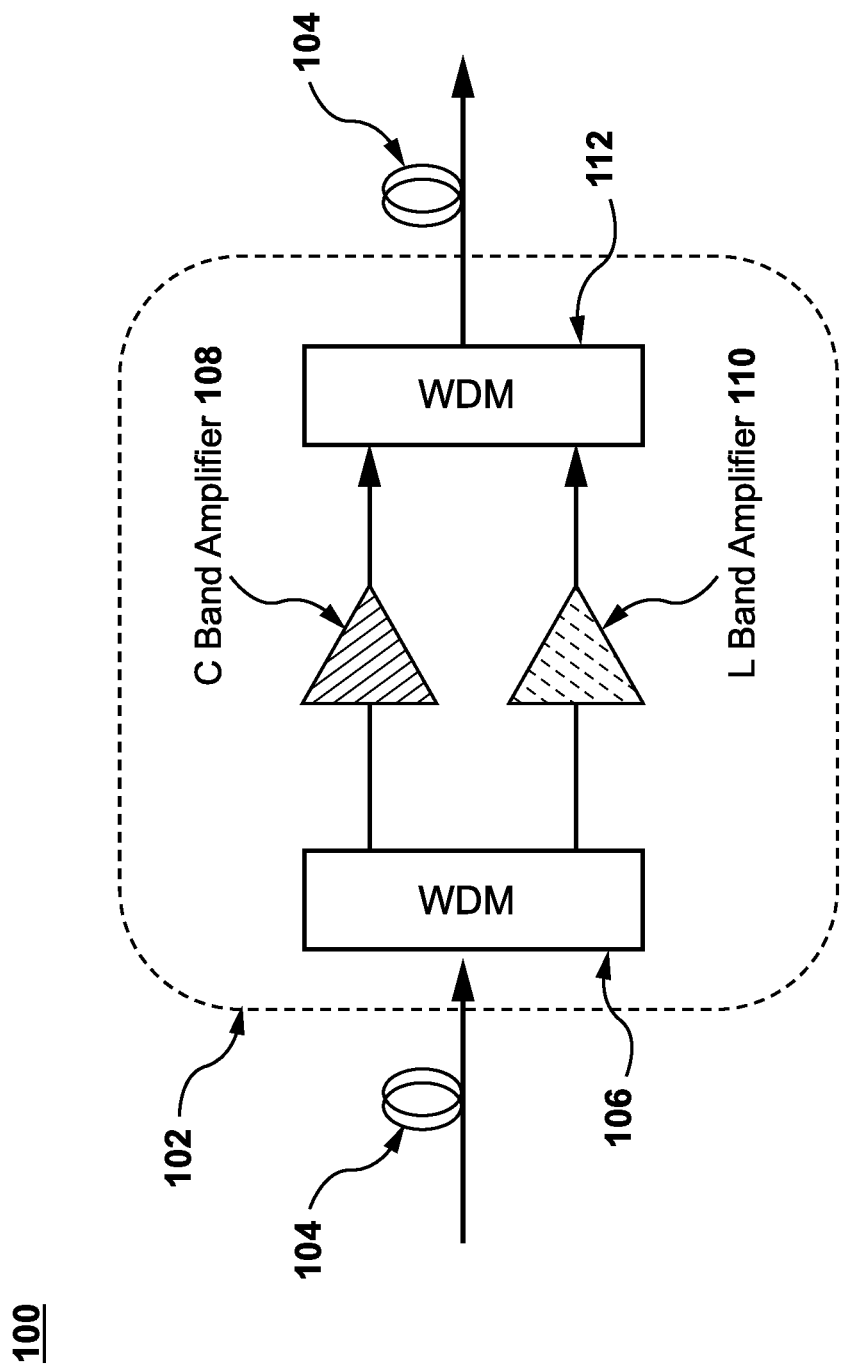
FIG. 3 (Prior Art) depicts a high level functional block diagram of a portion of an optical communication network.

FIG. 3 (Prior Art) depicts a high level functional block diagram of a portion 100 of an optical communication network. As shown portion 100 includes an optical node 102 and optical cables 104. It has been illustrated that optical node 102 includes a first wavelength division multiplexer (WDM) 106, a C band amplifier 108, a L band amplifier 110, and a second WDM 110. However, optical node 102 may include one or more optical network elements and modules (which may include either or both of active and passive elements/modules). For purposes of simplicity and tractability, these elements have been omitted from FIG. 3.

Optical node 102 may also incorporate one or more laser light sources configured to produce, emit, or radiate pulses of light with certain pulse duration. In certain embodiments, one or more pulsed laser light sources may comprise one or more laser diodes, such as but not limited to: Fabry-Perot laser diode, a quantum well laser, a distributed Bragg reflector (DBR) laser, a distributed feedback (DFB) laser, or a vertical-cavity surface-emitting laser (VCSEL). Just as examples, a given laser diode may be an aluminum-gallium-arsenide (AlGaAs) laser diode, an indium-gallium-arsenide (InGaAs) laser diode, or an indium-gallium-arsenide-phosphide (InGaAsP) laser diode, or any other suitable laser diode.

Further, optical node 102 may incorporate multiple optical amplifiers for example, C band amplifier 108, L band amplifier 110, In some examples, these amplifiers may be based on erbium-doped fiber amplifiers (EDFAs), for amplifying the optical WDM signals. Portion 100 of an optical communication network may further employ one or more optical network elements and modules (which may include either or both of active and passive elements/modules), such as, for example, optical filters, WSSs, arrayed waveguide gratings, optical transmitters, optical receivers, processors and other suitable components. However, for purposes of simplicity and tractability, these elements have been omitted from FIG. 3 (Prior Art).

It is to be contemplated that an optical communication network may include a plurality of optical nodes implemented in a similar manner as that of optical node 102. Such plurality of optical nodes may be communicatively connected by virtue of links including optical cables 104, where each optical cable may include a plurality of optical fibers. The optical fiber may be of any suitable type such as, for example, single mode optical fiber, multi-mode optical fiber, standard single mode fibers (SSMFs), large effective area fibers (LEAFs) or the like. The links also include a plurality of optical amplifiers, such as, for example, EDFAs.

With the optical node 102 in place, typically the WDM signals in C+L bands are transmitted over the optical cables 104. Optical node 102 is configured to receive the WDM signals in C+L bands and forwards the WDM signals to first WDM 106. First WDM 106 is configured to split the WDM signals in C+L bands into WDM signals in C band and WDM signals in L band. First WDM 106 provides the WDM signals in C band to C band amplifier 108 and the WDM signals in L band to L band amplifier 110. C band amplifier 108 is configured to amplify the WDM signals in C band and L band amplifier 110 is configured to amplify the WDM signals in L band. The amplified WDM signals in C band and L band and provided to second WDM 112. Second WDM 112 is configured to combine the amplified WDM signals in C band and L band and transmit the amplified WDM signals in C+L bands over optical cables 104.

Figure 4:
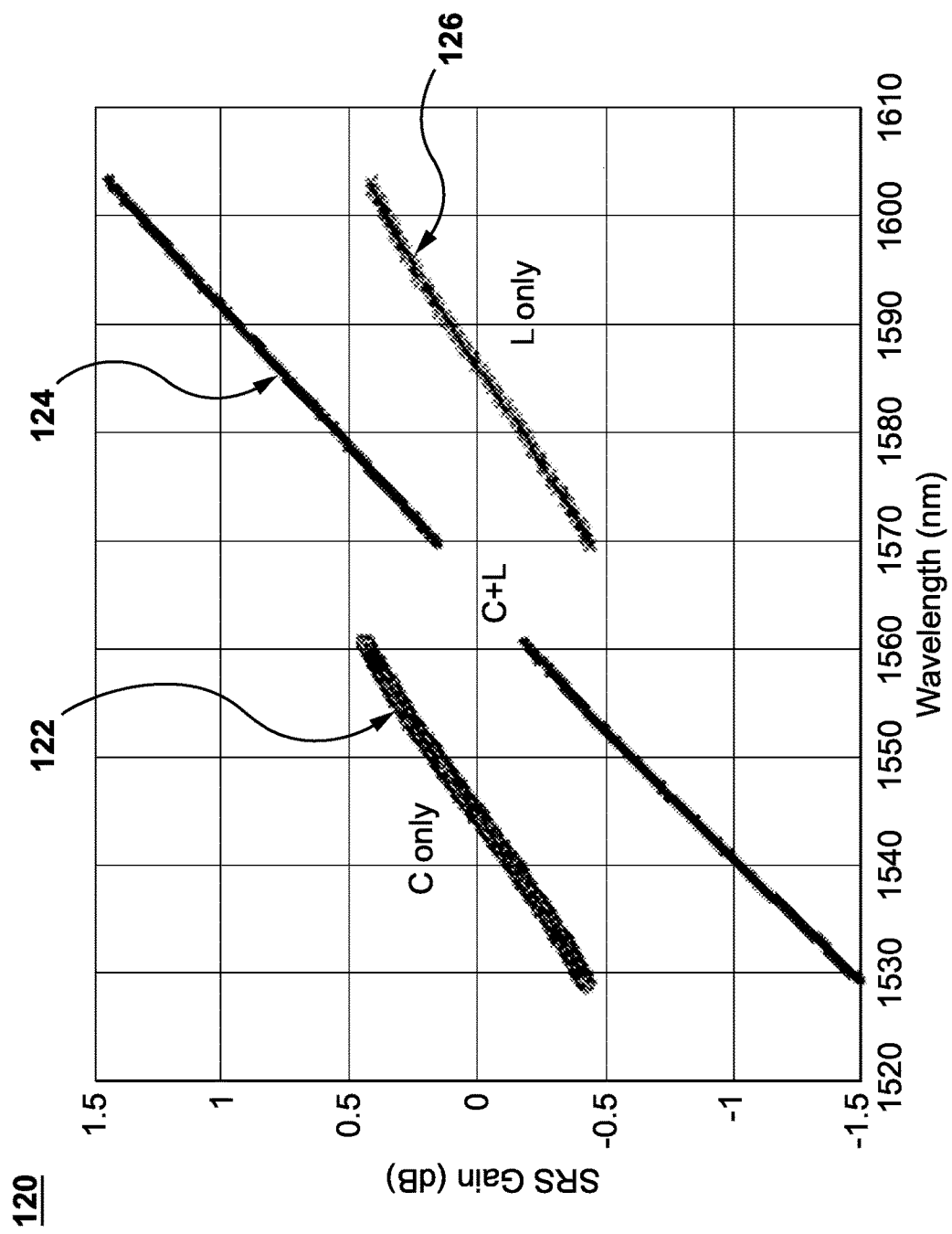
FIG. 4 (Prior Art) illustrates a simulation result of SRS induced gain $G_{SRS}(\lambda)$, assuming C band only, L band only and C+L bands.

At times, C band amplifier 108 or L band amplifier 110 fails in optical node 102. In this event, SRS induced gain $G_{SRS}(\lambda)$ in the optical fiber following optical node 300 changes drastically. To this end, gain/gain tilt of the surviving amplifier should be adjusted to compensate the effect of SRS induced gain $G_{SRS}(\lambda)$. As the SRS induced gain $G_{SRS}(\lambda)$ strongly depends on the channel conditions. FIG. 4 (Prior Art) illustrates a simulation result 120 of SRS induced gain $G_{SRS}(\lambda)$, assuming C band only, L band only and C+L bands. Parameters considered for simulation were 80 km single mode fiber (SMF) with 1 dBm per channel power into the SMF, and 80 channels in each band.

As shown, simulation result 120 illustrates SRS induced gain $G_{SRS}(\lambda)$ 122 due to C band only, SRS induced gain $G_{SRS}(\lambda)$ 124 due to C+L bands, SRS induced gain $G_{SRS}(\lambda)$ 126 due to L band only for different wavelengths. It is observed in simulation result 120 that SRS induces a negative gain in the short wavelength regime and positive gain the long wavelength regime.

Further, SRS induced gain $G_{SRS}(\lambda)$ 124 for C+L scenario is much stronger than SRS induced gain $G_{SRS}(\lambda)$ 122 with only C band or SRS induced gain $G_{SRS}(\lambda)$ 126 with only L band scenario. That is, if the WDM signals in C+L bands are propagating through optical node 100 and if C band amplifier 108 or L band amplifier 110 is dropped (e.g. amplifier failure), or added (e.g. restoration), SRS induced gain $G_{SRS}(\lambda)$ may change drastically.

If one amplifier fails, the other amplifier should be adjusted to offset the SRS induced gain change. For example, if L band amplifier 110 fails, the gain and the gain slope of C band amplifier 108 should be adjusted to offset the SRS gain change in optical cables 104. Also, if C band amplifier 108 fails, the gain and the gain slope of L band amplifier 110 should be adjusted to offset the SRS gain change in optical cables 104.

The SRS induced gain $G_{SRS}(\lambda)$ may be compensated by having opposite gain slope of the optical amplifier. For example, the gain slope for EDFA based optical amplifiers may be changed by changing the pump laser power, or internal variable optical attenuator (VOA), or other measures.

How the gain and the gain slope of the optical amplifiers should be adjusted is determined by the SRS induced gain change, which can be estimated by equation (6). To estimate the SRS induced gain change, per channel power information is required. It is to be noted that, optical amplifier failure can happen in microsecond time scale, therefore fast per channel power detection is required.

Figure 5:
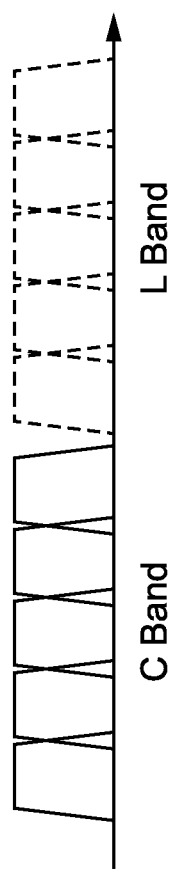
FIG. 5 (Prior Art) illustrates an example where C band and L band are divided into 10 sub-bands.

Since it is not practical to monitor the per channel power in the sub-microsecond time scale, in certain prior arts, the entire spectrum associated with C+L bands divides into multiple sub-bands, and the total power of each sub-band is monitored by a photodetector in sub-microsecond time scale. This total power of each sub-band is used to estimate the SRS induced gain. For example, FIG. 5 (Prior Art) illustrates an example 130 where C band and L band are divided into 10 sub-bands.

Figure 6:
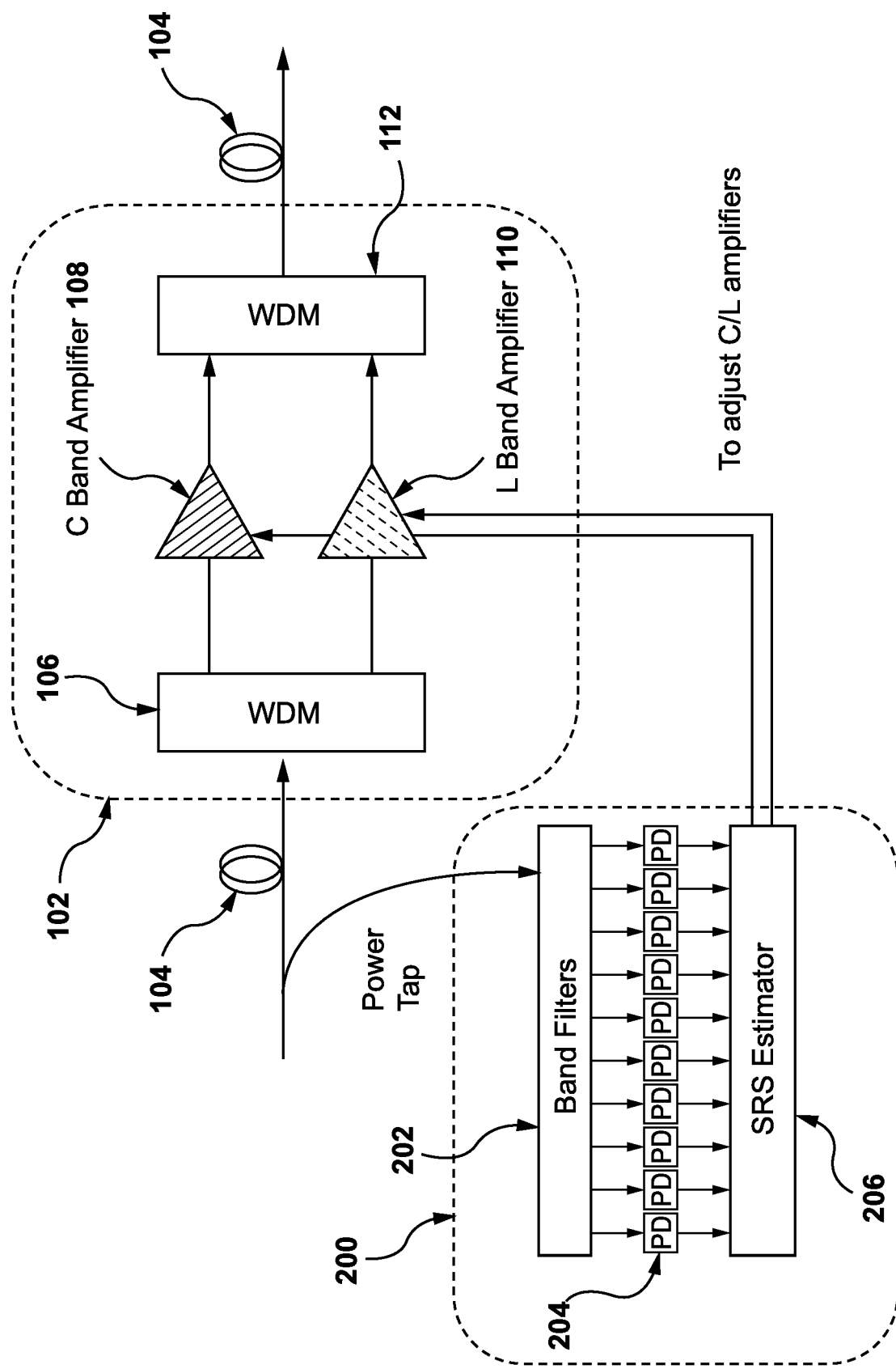
FIG. 6 (Prior Art) illustrates a typical SRS compensator implemented along with an optical node.

FIG. 6 (Prior Art) illustrates a typical SRS compensator 200 implemented along with the optical node 102. As shown, typical SRS compensator 200 includes a plurality of band pass filter 202, a plurality of fast photodetectors (PD) 204, and a SRS estimator 206. The plurality of band pass filters 202 tap some power from the optical cables 104 through which the WDM signals in C+L bands are being propagated. The plurality of band pass filter 202 is configured to divide the spectrum associated with the WDM signals in C+L bands into sub-bands as shown in example 130 (FIG. 5 (Prior Art)). The plurality of band pass filter 202 then provides the sub-bands in C and L bands to plurality of fast PD 204. The plurality of fast PD 204 is configured to convert the light signals to electrical signals (e.g. voltage, current and/or power signals) to compute power in each sub-band. SRS estimator 206 then estimates SRS induced gain change in the WDM signals in C+L bands by using equation (6). The estimated SRS induced gain change is used to control gain and gain slope of C band amplifier 108 and L band amplifier 110.

Although, estimation and compensation of SRS induced gain change by typical SRS compensator 200 can be done in real time (e.g. microsecond time scale), however, in a sub-band, only the total power is known, there is no information about the individual channel distribution. To this end, the estimated SRS induced gain change will have error and the corresponding compensation may degrade the SRS compensation provided by C band amplifier 108 and L band amplifier 110. In order to improve the performance, typical SRS compensator 200 needs to increase the number of sub-bands. Such sub-band power detection scheme is expensive to implement, because it requires additional hardware such as multiple optical band filters along with multiple fast PDs. Also, the cost of existing system in terms of hardware requirement is still high as it requires multiple optical band filters (e.g. 10 in above case) along with multiple fast PDs.

Figure 7:
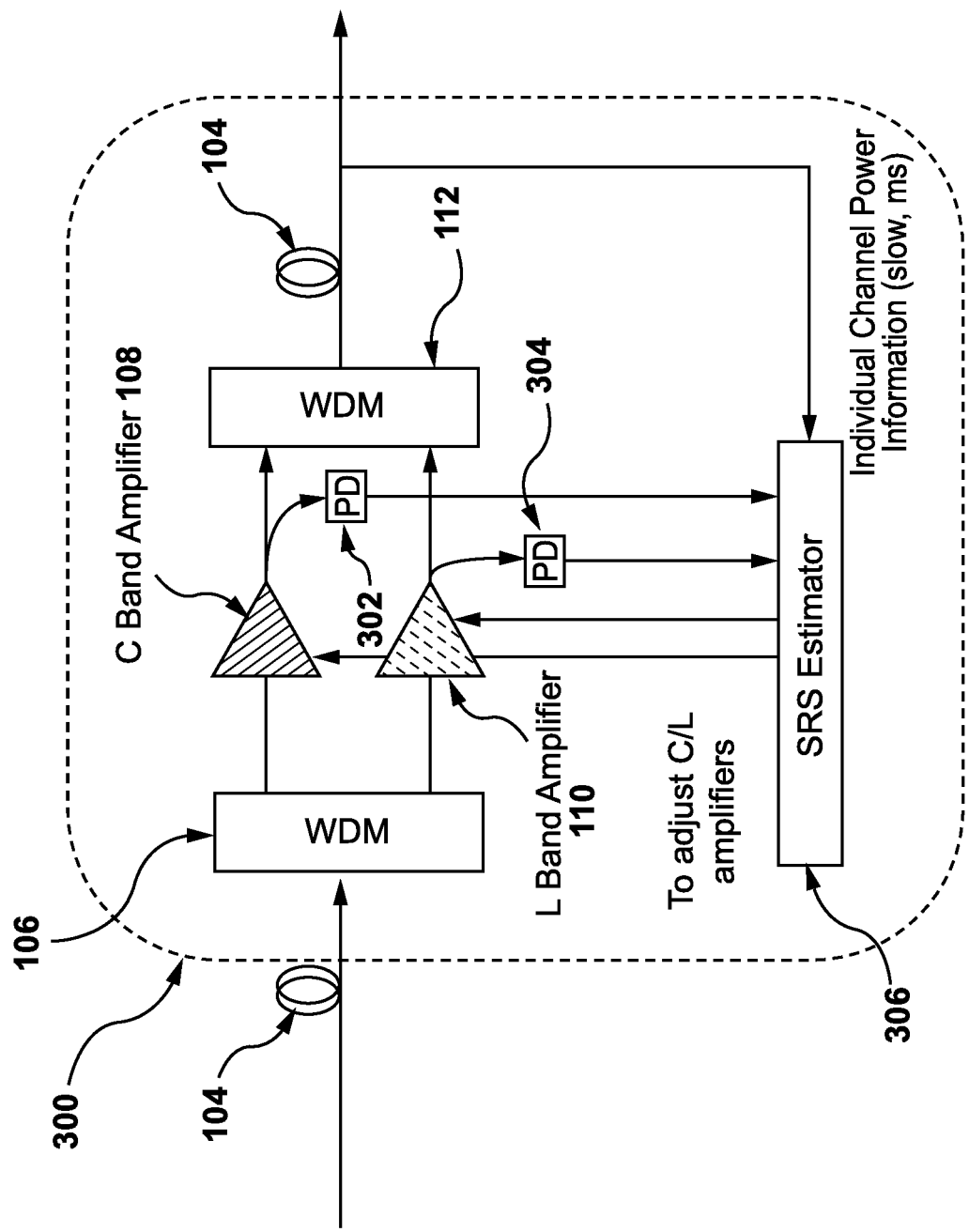
FIG. 7 illustrates a high level functional block diagram of an updated optical node, in accordance with various embodiments of present disclosure.

With that being said, FIG. 7 illustrates a high level functional block diagram of an updated optical node 300, in accordance with various embodiments of present disclosure. As shown, updated node 300 includes a first fast PD 302, a second fast PD 304, and a SRS estimator 306 along with other components of optical node 102. It is to be noted that updated optical node 300 may include other components and modules but have been omitted from the FIG. 7 for the purpose of simplicity and tractability.

It is to be noted that first fast PD 302 and second fast PD 304 have been shown as additional components outside C band amplifier 108 and L band amplifier 110. However, it will be appreciated that such fast PDs for total power monitoring may already exist in most of the optical amplifiers such as EDFA based optical amplifiers for regular monitoring/control. Hence further reducing the required hardware complexity. With this said, in certain embodiments, the functionality of the first fast PD 302 may be combined and performed with in C band amplifier 108. Similarly, the functionality of the second fast PD 304 may be combined and performed with in L band amplifier 110.

First fast PD 302 and second fast PD 304 are configured to tap some power from the output of the C band amplifier 108 and L band amplifier 110 respectively and convert the light signals to electrical signals and compute fast total instantaneous power $P_{tot-CBand}(t)$ associated with the WDM signals in C band and fast total instantaneous power $P_{tot-LBand}(t)$ associated with the WDM signals in L band on sub-microseconds time scale. That is, the fast total instantaneous powers $P_{tot-CBand}(t)$ and $P_{tot-LBand}(t)$ are measured on a fast time scale. In certain embodiments, the fast time scale may range between 0.1 to 100 microseconds.

The fast total instantaneous powers $P_{tot-CBand}(t)$ and $P_{tot-LBand}(t)$ are provided to SRS estimator 306. SRS estimator 306 is also proved with slow per channel power information such as $P(\lambda_1), P(\lambda_2) \ldots P(\lambda_n)$ where, $P(\lambda_1), P(\lambda_2) \ldots P(\lambda_n)$ are slow per channel powers in C+L bands. The slow per channel power information is computed slow time scale. In certain embodiments, the slow time scale may range between 0.1 millisecond to 100 seconds. Such slow per channel power information may be computed from WDM signals propagating in optical cables 104. In certain embodiments, slow per channel power information may be obtained by any suitable means such as by using an optical performance monitor (OPM), a device that monitors the per channel power, among others or other means such as pilot tone or the like. Further details about how slow per channel information may be obtained will be discussed later in this disclosure.

In certain embodiments, in order to compute per channel power in C band or L band, SRS estimator 306 relies on the latest relative slow per channel information in the respective C or L band. Let slow per channel powers in C+L band are $P(\lambda_i), P(\lambda_2) \ldots P(\lambda_n)$. That is, $P(\lambda_1)$ is the slow channel power of the WDM signal having wavelength $\lambda_1$, $P(\lambda_2)$ is the slow channel power of the WDM signal having wavelength $\lambda_2$ and so on. Also, let the wavelengths associated with the C band are $P(\lambda_1), P(\lambda_2) \ldots P(\lambda_k)$ and wavelengths associated with the L band are $P(\lambda_{k+1}), P(\lambda_{k+2}) \ldots P(\lambda_n)$.

It has been observed that during fast transient (failure of either C band amplifier 108 or L band amplifier 110), the instantaneous per channel power is given by:

$$P(\lambda_i, t) = k(t) P(\lambda_i) \qquad (7)$$

where, $k(t)$ is the scaling factor, reflecting the fast power change during transient.

For C band, the fast total instantaneous power is $P_{tot-CBand}(t)$, which can be represented using equation (7) as follows:

$$P_{tot-CBand}(t) = \sum_{i=1}^{k} k(t) P(\lambda_i) \qquad (8)$$

It has also been observed that the scaling factor $k(t)$ is almost same for each slow per channel power $P(\lambda_i)$. To this end, the scaling factor $k(t)$ may be represented using equation (8) as follows:

$$k(t) = \frac{P_{tot-CBand}(t)}{\sum_{i=1}^{k} P(\lambda_i)} \qquad (9)$$

On substituting equation (9) in equation (7), the instantaneous fast per channel power in C band can be represented as:

$$P(\lambda_i, t) = \frac{P(\lambda_i)}{\sum_{i=1}^{k} P(\lambda_i)} P_{tot-CBand}(t) \qquad (10)$$

Similarly, for L band, the fast total instantaneous power is $P_{tot-LBand}(t)$, which can be represented using equation (7) as follows:

$$P_{tot-LBand}(t) = \sum_{i=k+1}^{n} k(t) P(\lambda_i) \qquad (11)$$

The scaling factor $k(t)$ may be represented using equation (11) as follows:

$$k(t) = \frac{P_{tot-LBand}(t)}{\sum_{i=k+1}^{n} P(\lambda_i)} \qquad (12)$$

On substituting equation (12) in equation (7), the instantaneous fast per channel power in L band can be represented as:

$$P(\lambda_i, t) = \frac{P(\lambda_i)}{\sum_{i=k+1}^{n} P(\lambda_i)} P_{tot-LBand}(t) \qquad (13)$$

Using equations (6) and (10), SRS estimator 306 may estimate SRS induced gain in C band and may provide a control signal to adjust the gain and the gain slope of C band amplifier 108 to offset the SRS gain change in optical cables 104. C band amplifier 108 is further configured to adjust its gain in accordance with the control signal as provided by SRS estimator 306. Also, using equations (6) and (13), SRS estimator 306 may estimate SRS induced gain in L band and may provide a control signal to adjust the gain and the gain slope of L band amplifier 110 to offset the SRS gain change in optical cables 104. L band amplifier 110 is further configured to adjust its gain in accordance with the control signal as provided by SRS estimator 306.

It is to be noted that during fast transient, although the absolute power of each channel changes, however, the relative power between channels in each band remains almost same. In C band the relative power in each channel is given by $$\frac{P(\lambda_i)}{\sum_{i=1}^{k} P(\lambda_i)},$$

where $P(\lambda_i)$ is the slow power associated with the ith wavelength $\lambda_i$ in C band and in L band the relative power in each channel is given by $$\frac{P(\lambda_i)}{\sum_{i=k+1}^{n} P(\lambda_i)},$$

where $P(\lambda_i)$ is the slow power associated with the ith wavelength $\lambda_i$ in L band.

It is to be noted that although SRS estimator 306 has been shown as integral part updated optical node 300, in certain embodiments, SRS estimator 306 may be located external to updated optical node 300 without limiting the scope of present disclosure. It is to be noted that SRS estimator 306 may comprise one or more computing devices, represented as a single server. Although represented as a single server, SRS estimator 306 may be implemented as one or more real or virtual servers. It is to be contemplated that existing hardware components may be used while implementing SRS estimator 306 with in each optical node, thereby saving some cost in terms of resources required for such implementation.

Figure 8:
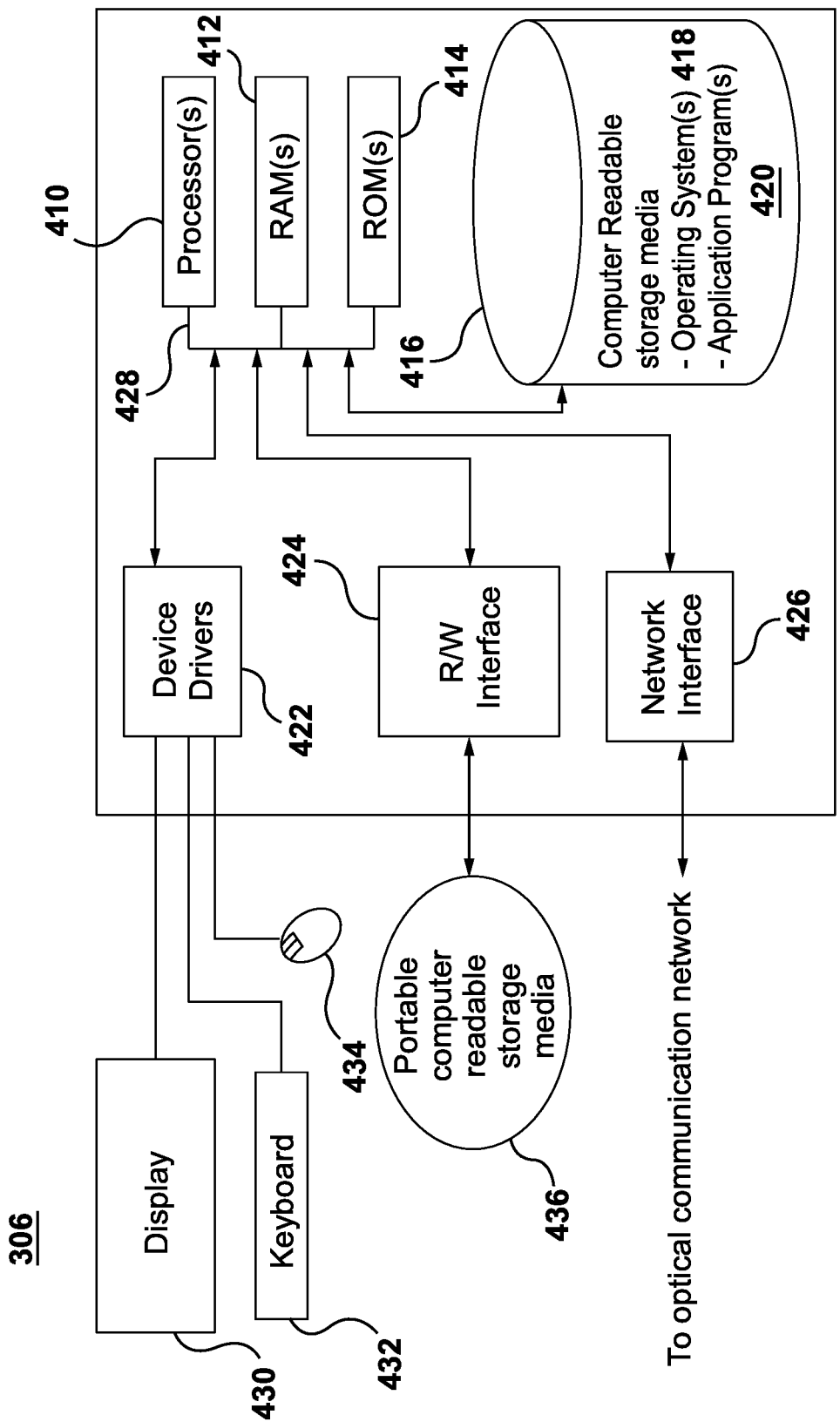
FIG. 8 depicts a high-level block diagram of representative components for SRS estimator, in accordance with various embodiments of the present disclosure.

FIG. 8 depicts a high-level block diagram of representative components for SRS estimator 306, in accordance with various embodiments of the present disclosure. It should be appreciated that FIG. 8 provides only an illustration of one implementation of SRS estimator 306 and does not imply any limitations with regard to the environments in which different embodiments may be implemented. Many modifications to the depicted environment can be done to implement SRS estimator 306 without departing from the principles presented herein.

As shown, SRS estimator 306 employs one or more processors 410, one or more computer-readable random access memories (RAMs) 412, one or more computer-readable read only memories (ROMs) 414, one or more computer-readable storage media 416, device drivers 422, a read/write (R/W) interface 424, a network interface 426, all interconnected over a communications fabric 120. Communication fabric 428 may be implemented with any architecture designed for passing data and/or control information between processors (such as microprocessors, communications and network processors, etc.), memory, peripheral devices, and any other hardware components within a system.

One or more operating system(s) 418 and one or more application program(s) 420 are stored on one or more of computer-readable storage media 416 for execution by one or more of the processors 410 via one or more of the respective RAMs 412 (which typically include a cache memory). In the illustrated embodiment, each of computer-readable storage media 416 may be a magnetic disk storage device of an internal hard drive, CD-ROM, DVD, memory stick, magnetic tape, magnetic disk, optical disc, a semiconductor storage device such as RAM, ROM, EPROM, flash memory or any other computer-readable tangible storage device that can store a computer program and digital information.

SRS estimator 306 may also include the R/W drive or interface 424 to read from and write to one or more portable computer readable storage media 436. Application programs 420 on said devices may be stored on one or more of the portable computer readable storage media 436, read via the respective R/W drive or interface 424 and loaded into the respective computer readable storage media 416.

It will be appreciated that in certain embodiments the application programs 420 stored on one or more of the portable computer readable storage media 436 may configure SRS estimator 306 to provide various functionalities, in accordance with various embodiments of the present disclosure.

Application programs 420 on the said SRS estimator 306 may be downloaded to SRS estimator 306 from an external computer or external storage device via a communication network (for example, the Internet, a local area network or other wide area network or wireless network) and network interface 426. From network interface 426, the programs may be loaded onto computer-readable storage media 416.

SRS estimator 306 may also include a display screen 430, a keyboard or keypad 432, and a computer mouse or touchpad 434. The device drivers 422 may interface to display screen 430 for imaging, to keyboard or keypad 432, to a computer mouse or touchpad 434, and/or to display screen 430 (in case of touch-screen display) for pressure sensing of alphanumeric character entry and user selections. Device drivers 422, R/W interface 424 and network interface 426 may comprise hardware and software (stored on computer-readable storage media 416 and/or ROM 414).

The programs described herein are identified based upon the application for which they are implemented in a particular embodiment of the present disclosure. However, it should be appreciated that any particular program nomenclature herein is used merely for convenience, and thus the disclosure should not be limited to use solely in any specific application identified and/or implied by such nomenclature.

It will be appreciated that SRS estimator 306 may be a server, a desktop computer, a laptop computer, a tablet, a smartphone, a personal digital assistant or any device that may be configured to implement the present technology, as should be understood by a person skilled in the art.

Figure 9:
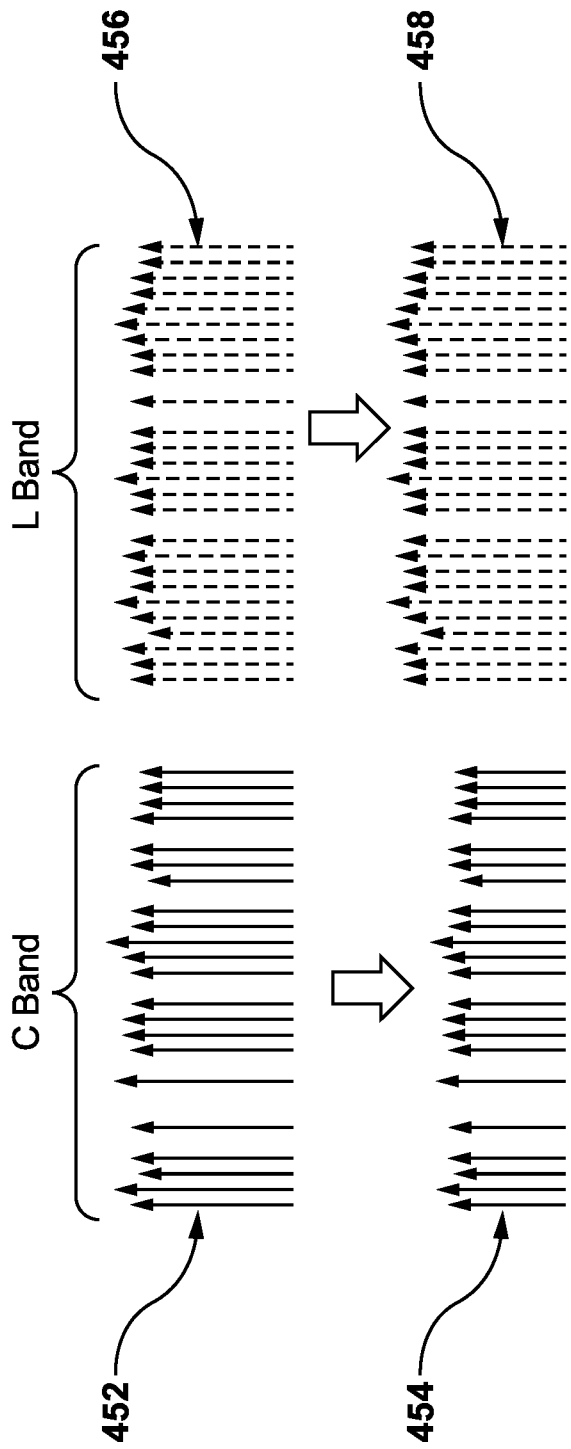
FIG. 9 represents examples of per channel power before and during transient, in accordance with various embodiments of present disclosure.

FIG. 9 represents examples of per channel power before and during transient, in accordance with various embodiments of present disclosure. As shown, 452 represents per channel power at the output of C band amplifier 108 before transient and 456 represents per channel power at the output of L band amplifier 110 before transient i.e. when both C band amplifier 108 and L band amplifier 110 are functional. In the event of failure of C band amplifier 110, per channel power at the output of C band amplifier 108 during the transient is represented by 454 and per channel power at the output of L band amplifier 110 during the transient is represented by 458. It has been observed that the relative per channel powers in C band before and during transient remains mostly the same, while the absolute power drops in C band drops. At the same time, per channel power at the output of L band amplifier 110.

Figure 10:
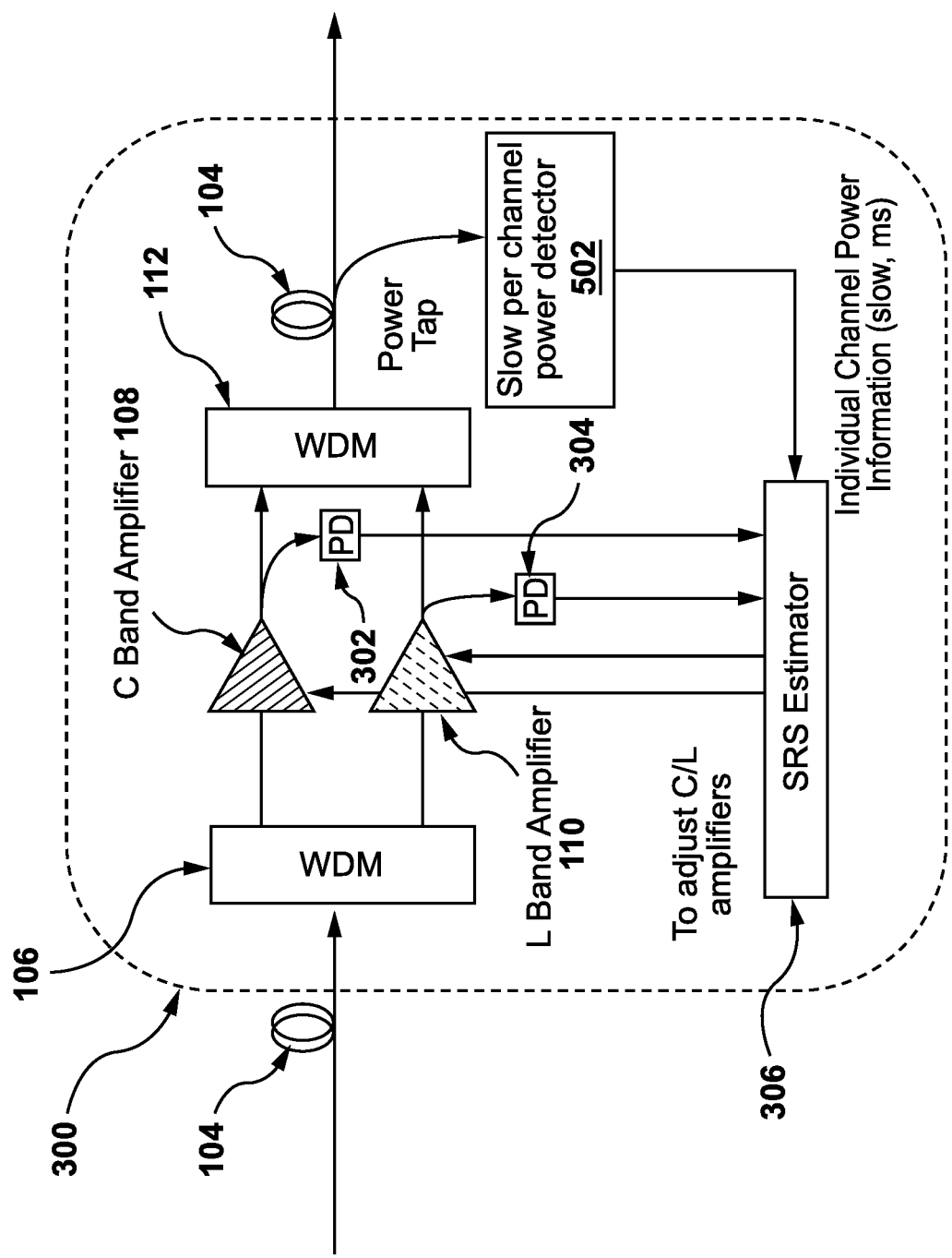
FIG. 10 illustrates a slow per channel power detector implemented along optical cables between two updated optical nodes, in accordance with various embodiments of present disclosure.

In certain non-limiting embodiments, the slow per channel power may be provided by a slow per channel power detector to SRS estimator 306. To this end, FIG. 10 illustrates a slow per channel power detector 502 implemented along optical cables 104 between two updated optical nodes 300, in accordance with various embodiments of present disclosure. As shown, a portion of WDM signals in C+L bands propagating in the optical fibers 104 is tapped and is provided to slow per channel power detector 502. Slow per channel power detector 502 is configured to extract slow per channel powers $P(\lambda_1)$, $P(\lambda_2)$ ... $P(\lambda_n)$ and provides the extracted powers to SRS estimator 306.

In certain embodiments, slow per channel power detector 502 may be implemented using an OPM. It is to be noted that OPM is a well known component in the art and the functionality of OPM should not limit the scope of present disclosure.

In other non-limiting embodiments, slow per channel power detector 502 may be based on amplitude modulation pilot tone-based channel supervision to extract slow per channel powers $P(\lambda_1)$, $P(\lambda_2)$ ... $P(\lambda_n)$. With pilot tone-based channel supervision, a small modulation index and relatively low frequency (kHz to MHz) intensity modulation is applied to a pilot tone at the transmitter. Each wavelength in the WDM signals in C+L bands are assigned with a unique pilot tone frequency.

It is to be noted that although slow per channel power detector 502 has been shown external to updated optical node 300, in certain embodiments, slow per channel power detector 502 may be an integral part of updated optical node 300 without limiting the scope of present disclosure. In such embodiments, slow per channel power detector 502 may be either located at the output of second WDM 112 or may be placed at the output of C band amplifier 108 and L band amplifier 110.

Figure 11:
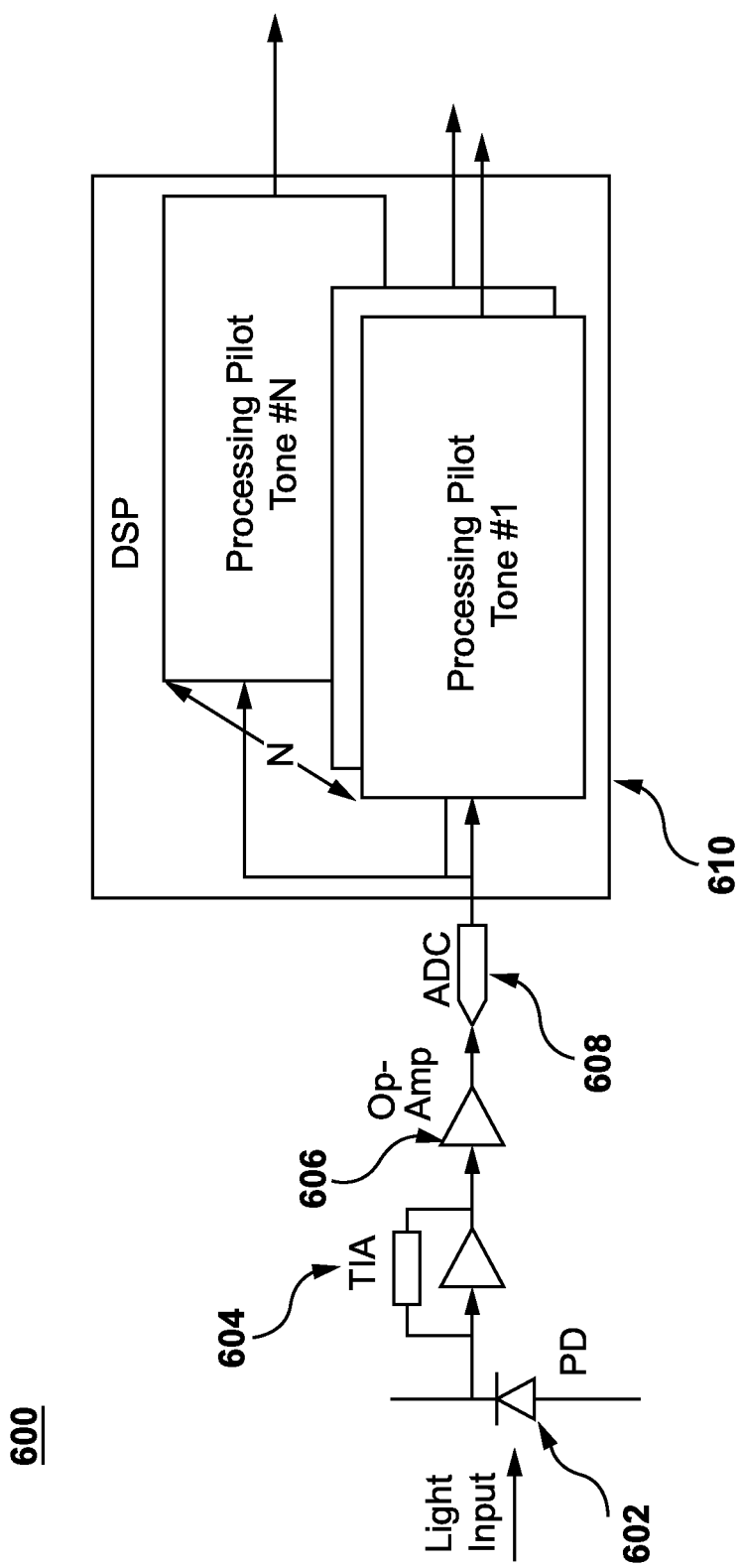
FIG. 11 illustrates a pilot tone detector (PTD), in accordance with various embodiments of present disclosure.

With this said, FIG. 11 illustrates a pilot tone detector (PTD) 600, in accordance with various embodiments of present disclosure. It will be appreciated that, in certain embodiments, implementation of slow per channel power detector 502 may be based on PTD 600. The pilot tones may be detected along the optical cables 104 by tapping off a small portion of power of the WDM signals in C+L bands into PTD 600. As shown, PTD 600 includes a PD 602, a transimpedance preamplifier (TIA) 604, an electrical amplifier 606, an analog-to-digital converter (ADC) 608 and a digital signal processor (DSP) 610. It is to be noted that PTD 600 may include other components and modules but have been omitted from the FIG. 10 for the purpose of simplicity and tractability.

PD 602 may be configured to receive tapped portion of the WDM signals in C+L bands and convert it into a weak electrical signal. The weak electrical signal may be provided to TIA 604 that converts the weak electrical signal into an output electrical signal strong enough to be noise-tolerant and strong enough for further processing. The output of TIA may be provided to electrical amplifier 606 for further amplification. The amplified electrical signal is the then converted to digital signals by ADC 608 and is supplied to DSP 610. For each channel, DSP 610 may be configured to extract slow per channel powers $P(\lambda_1)$, $P(\lambda_2)$ ... $P(\lambda_n)$ and channel identification information from the tone amplitude and its associated data and provides the extracted powers to SRS estimator 306.

It is to be noted that, using PTD 600 circumvents the need of high-speed component required for pilot tone detection as the tone frequency range is only up to several tens of MHz. Moreover, a single PTD 600 may be used to monitor all the wavelengths of the WDM signals in C+L bands without utilizing any expensive optical demultiplexers. Also, by using PTD 600 the measurement may be performed at much faster rate (milliseconds instead of seconds).

Thus, by virtue of updated optical node 300 instead of using multiple optical band filters and fast PDs to obtain sub-band power, slow per channel power is used along with the fast total power in C band and L band to derive fast per channel power without adding much of the additional hardware.

Figure 12:
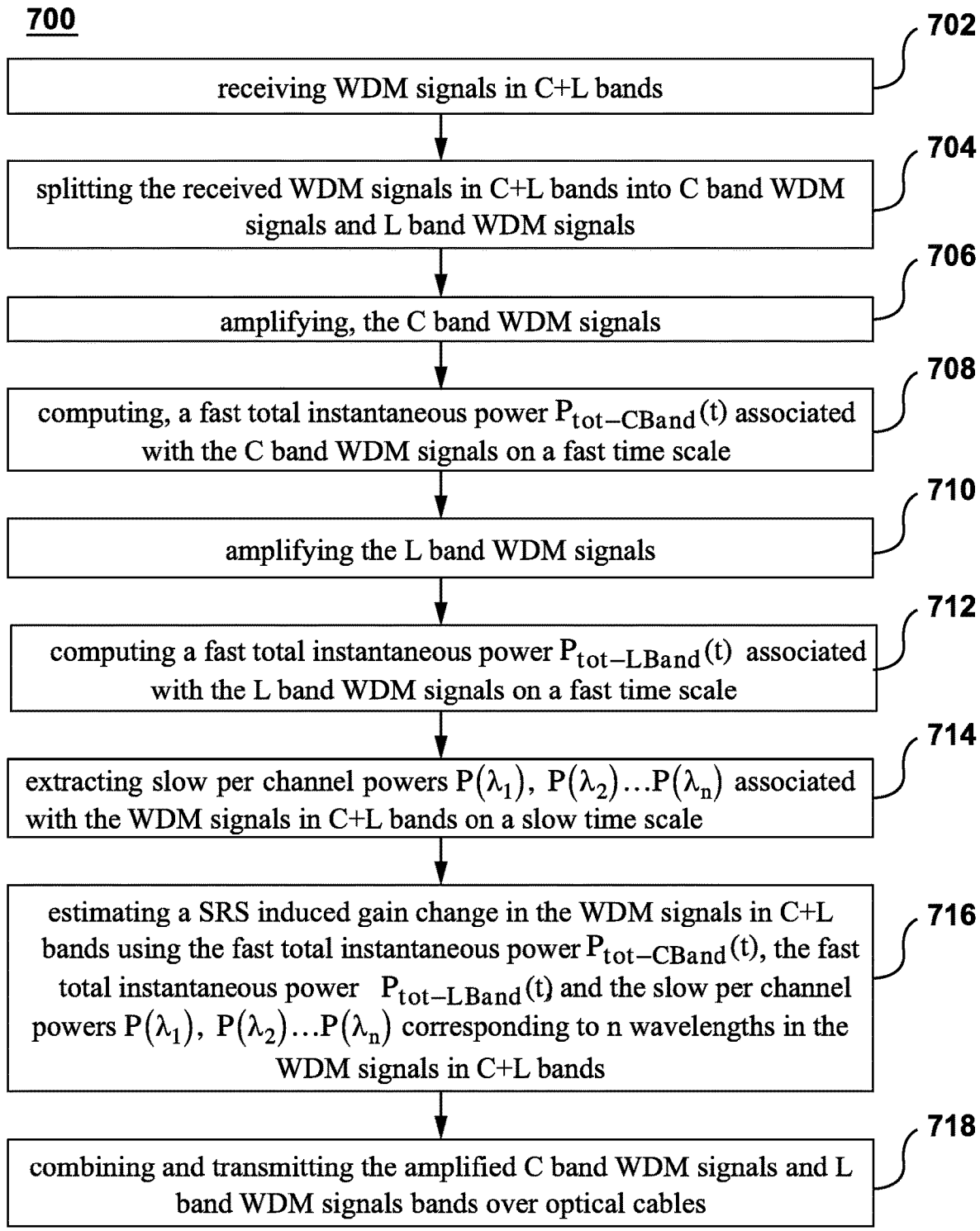
FIG. 12 depicts a flowchart representing process directed to a method implemented on the updated optical node to estimate SRS induced gain change, in accordance with various embodiments of present disclosure.

FIG. 12 depicts a flowchart representing process 700 directed to a method implemented on the updated optical node 300 to estimate SRS induced gain change, in accordance with various embodiments of present disclosure.

As shown, process 700 begins at step 702, where a first wavelength division multiplexer (WDM) receives WDM signals in C+L bands. As noted above, first WDM 106 receives WDM signals in C+L bands transmitted over the optical cables 104.

Process 700 proceeds to step 704, where the first WDM splits the received WDM signals in C+L bands into C band WDM signals and L band WDM signals. As previously discussed, first WDM 106 is configured to split the WDM signals in C+L bands into WDM signals in C band and WDM signals in L band. First WDM 106 provides the WDM signals in C band to C band amplifier 108 and the WDM signals in L band to L band amplifier 110.

Process 700 advances to step 706, where a C band amplifier amplifies the C band WDM signals. As discussed above, C band amplifier 108 amplifies the WDM signals in C band. Process 700 proceeds to step 708, where the C band amplifier computes a fast total instantaneous power $P_{tot-CBand}(t)$ associated with the C band WDM signals on a fast time scale. As noted above, C band amplifier 108 computes fast total instantaneous power $P_{tot-CBand}(t)$ associated with the WDM signals in C band.

Process 700 advances to step 710, where a L band amplifier amplifies the L band WDM signals. As discussed above, L band amplifier 110 amplifies the WDM signals in L band. Process 700 proceeds to step 712, where the L band amplifier computes a fast total instantaneous power $P_{tot-LBand}(t)$ associated with the L band WDM signals on a fast time scale. As noted above, L band amplifier 110 computes fast total instantaneous power $P_{tot-LBand}(t)$ associated with the WDM signals in L band.

Process 700 proceeds to step 714, where a slow per channel power detector extracts slow per channel powers $P(\lambda_1)$, $P(\lambda_2)$ ... $P(\lambda_n)$ associated with the WDM signals in C+L bands on a slow time scale. As previously discussed, slow per channel power detector 502 is configured to extract slow per channel powers $P(\lambda_1)$, $P(\lambda_2)$ ... $P(\lambda_n)$ and provides the extracted powers to SRS estimator 306.

Process 700 advances to step 716, where a Stimulated Raman Scattering (SRS) estimator estimates a SRS induced gain change in the WDM signals in C+L bands using the fast total instantaneous power $P_{tot-CBand}(t)$, the fast total instantaneous power $P_{tot-LBand}(t)$, and the slow per channel powers $P(\lambda_1)$, $P(\lambda_2)$ ... $P(\lambda_n)$ corresponding to n wavelengths in the WDM signals in C+L bands. As previously discussed, using equations (6) and (10), SRS estimator 306 estimates SRS induced gain in C band. Also, using equations (6) and (13), SRS estimator 306 estimates SRS induced gain in L band.

In certain steps, based on estimated SRS induced gain in C band, SRS estimator 306 may provide a control signal to adjust the gain and the gain slope of C band amplifier 108 to offset the SRS gain change in optical cables 104. C band amplifier 108 may be further configured to adjust its gain in accordance with the control signal as provided by SRS estimator 306.

In certain steps, based on estimated SRS induced gain in L band, SRS estimator 306 may provide a control signal to adjust the gain and the gain slope of L band amplifier 110 to offset the SRS gain change in optical cables 104. L band amplifier 110 may be further configured to adjust its gain in accordance with the control signal as provided by SRS estimator 306.

Finally at step 718, a second WDM combines and transmits the amplified C band WDM signals and L band WDM signals bands over optical cables. As noted above, Second WDM 112 is configured to combine the amplified WDM signals in C band and L band and transmit the amplified WDM signals in C+L bands over optical cables 104.

It is to be understood that the operations and functionality of updated optical node 300, constituent components, and associated processes may be achieved by any one or more of hardware-based, software-based, and firmware-based elements. Such operational alternatives do not, in any way, limit the scope of the present disclosure.

It will also be understood that, although the embodiments presented herein have been described with reference to specific features and structures, it is clear that various modifications and combinations may be made without departing from such disclosures. The specification and drawings are, accordingly, to be regarded simply as an illustration of the discussed implementations or embodiments and their principles as defined by the appended claims, and are contemplated to cover any and all modifications, variations, combinations or equivalents that fall within the scope of the present disclosure.

What is claimed is:

1. An optical communication system comprising:
   a first wavelength division multiplexer (WDM) configured to receive WDM signals in C+L bands, the first WDM is further configured to split the received WDM signals into C band WDM signals and L band WDM signals;
   a C band amplifier configured to amplify the C band WDM signals and compute a first total instantaneous power associated with the C band WDM signals on a first time scale;
   an L band amplifier configured to amplify the L band WDM signals and compute a second total instantaneous power associated with the L band WDM signals on the first time scale;
   a slow per channel power detector configured to extract slow per channel powers associated with the WDM signals on a second time scale;
   a Stimulated Raman Scattering (SRS) estimator configured to estimate an SRS induced gain change in the WDM signals using the first total instantaneous power, the second total instantaneous power, and the slow per channel powers corresponding to n wavelengths in the WDM signals, wherein n is an integer; and
   a second WDM configured to combine and transmit the amplified C band WDM signals and L band WDM signals over optical cables.

2. The optical communication system of claim 1, wherein the first time scale comprises a fast time scale, and the fast time scale is of the order of microseconds.

3. The optical communication system of claim 1, wherein the second time scale comprises a slow time scale, and the slow time scale is in the range of milliseconds to seconds.

4. The optical communication system of claim 1, wherein the SRS estimator computes an instantaneous fast per channel power in C band as follows:

$$P(\lambda_i, t) = \frac{P(\lambda_i)}{\sum_{i=1}^{k} P(\lambda_i)} P_{tot-CBand}(t)$$

where, $P(\lambda_i, t)$ is the instantaneous fast per channel power corresponding to ith wavelength in C band at time instant t, $P(\lambda_i)$ is slow per channel power corresponding to ith wavelength in C band, $$\sum_{i=1}^{k} P(\lambda_i)$$

is sum of k slow per channel powers in C band, and $P_{tot-CBand}(t)$ is the first total instantaneous power associated with the C band WDM signals at time instant t.

5. The optical communication system of claim 1, wherein the SRS estimator computes an instantaneous fast per channel power in L band as follows:

$$P(\lambda_i, t) = \frac{P(\lambda_i)}{\sum_{i=k+1}^{n} P(\lambda_i)} P_{tot-LBand}(t)$$

where, $P(\lambda_i, t)$ is the instantaneous fast per channel power corresponding to ith wavelength in L band at time instant t, $P(\lambda_i)$ is slow per channel power corresponding to ith wavelength in L band, $$\sum_{i=k+1}^{n} P(\lambda_i)$$

is sum of n-k slow per channel powers in L band, and $P_{tot-LBand}(t)$ is the second total instantaneous power associated with the L band WDM signals at time instant t.

6. The optical communication system of claim 1, wherein the SRS estimator estimate SRS induced gain change as follows:

$$G(dB)(\lambda_1, \lambda_2 \ldots \lambda_n) = 4.3429 \left( G_R \frac{L_{eff}}{A_{eff}} - \alpha_S L \right)$$

where, $G_R$ is a Raman gain vector, $\alpha_S$ is an optical fiber loss coefficient for signal, $A_{eff}$ is the effective area of the optical fiber, $L_{eff}$ is the effective nonlinear length of the optical fiber, L is the actual length of optical fiber.

7. The optical communication system of claim 1, wherein the SRS estimator generates at least one control signal to adjust a gain of at least one of the C band amplifier or L band amplifier in accordance with the estimated SRS induced gain.

8. The optical communication system of claim 7, wherein the at least one of C band amplifier or L band amplifier is further configured to adjust their gain in accordance with the at least one control signal.

9. The optical communication system of claim 1, wherein the slow per channel power detector includes an optical performance monitor.

10. The optical communication system of claim 1, wherein the slow per channel power detector includes a pilot tone detector.

11. An optical communication method comprising:
receiving wavelength division multiplexer (WDM) signals in C+L bands;
splitting the received WDM signals into C band WDM signals and L band WDM signals;
amplifying the C band WDM signals;
computing a first total instantaneous power associated with the C band WDM signals on a first time scale;
amplifying the L band WDM signals;
computing a second total instantaneous power $P_{tot-LBand}$(t) associated with the L band WDM signals on the first time scale;
extracting slow per channel powers associated with the WDM signals on a second time scale;
estimating an SRS induced gain change in the WDM signals using the first total instantaneous power, the second total instantaneous power, and the slow per channel powers corresponding to n wavelengths in the WDM signals, wherein n is an integer; and
combining and transmitting the amplified C band WDM signals and L band WDM signals bands over optical cables.

12. The optical communication method of claim 11, wherein the first time scale comprises a fast time scale, and the fast time scale is of the order of microseconds.

13. The optical communication method of claim 11, wherein the second time scale comprises a slow time scale, and the slow time scale is in the range of milliseconds to seconds.

14. The optical communication method of claim 11, further comprises computing an instantaneous fast per channel power in C band as follows:

$$P(\lambda_i, t) = \frac{P(\lambda_i)}{\sum_{i=1}^{k} P(\lambda_i)} P_{tot-CBand}(t)$$

where, $P(\lambda_i, t)$ is the instantaneous fast per channel power corresponding to ith wavelength in C band at time instant t, $P(\lambda_i)$ is slow per channel power corresponding to ith wavelength in C band, $$\sum_{i=1}^{k} P(\lambda_i)$$

is sum or K slow per channel powers in C band, and $P_{tot-CBand}$(t) is the first total instantaneous power associated with the C band WDM signals at time instant t.

15. The optical communication method of claim 11, further comprises computing, an instantaneous fast per channel power in L band as follows:

$$P(\lambda_i, t) = \frac{P(\lambda_i)}{\sum_{i=k+1}^{n} P(\lambda_i)} P_{tot-LBand}(t)$$

where, $P(\lambda_i, t)$ is the instantaneous fast per channel power corresponding to ith wavelength in L band at time instant t, $P(\lambda_i)$ is slow per channel power corresponding to ith wavelength in L band, $$\sum_{i=k+1}^{n} P(\lambda_i)$$

is sum of n-k slow per channel powers in L band, and $P_{tot-LBand}$(t) is the second total instantaneous power associated with the L band WDM signals at time instant t.

16. The optical communication method of claim 11, wherein the SRS induced gain change is estimated as follows:

$$G(dB)(\lambda_1, \lambda_2 \ldots \lambda_n) = 4.3429 \left( G_R \frac{L_{eff}}{A_{eff}} - \alpha_S L \right)$$

where, $G_R$ is a Raman gain vector, $\alpha_S$ is an optical fiber loss coefficient for signal, $A_{eff}$ is the effective area of the optical fiber, $L_{eff}$ is the effective nonlinear length of the optical fiber, L is the actual length of optical fiber.

17. The optical communication method of claim 11, further comprises generating at least one control signal to adjust a gain of at least one of the C band amplifier or L band amplifier in accordance with the estimated SRS induced gain.

18. The optical communication method of claim 17, wherein at least one of the C band amplifier or L band amplifier adjust their gain in accordance with the at least one control signal.

19. The optical communication method of claim 11, wherein the slow per channel powers are extracted by an optical performance monitor.

20. The optical communication method of claim 11, wherein the slow per channel powers are extracted by a pilot tone detector.

* * * * *